United States Patent [19]

Gizolme

[11] Patent Number: 4,719,537
[45] Date of Patent: Jan. 12, 1988

[54] METALLIZED DIELECTRIC FOIL FOR MAKING ELECTRICAL CAPACITORS OF THE COILED TYPE, AND CAPACITORS OBTAINED

[75] Inventor: Alain Gizolme, Charbonnieres les Bains, France

[73] Assignee: Le Condensateur Prelyo, Saint Genis Laval, France

[21] Appl. No.: 38,066

[22] Filed: Apr. 14, 1987

[30] Foreign Application Priority Data

Apr. 25, 1986 [FR] France ............................. 86 06229

[51] Int. Cl.⁴ .......................................... H01G 1/015
[52] U.S. Cl. ................................................. 361/273
[58] Field of Search ............................... 361/303–305, 361/273, 275

[56] References Cited

U.S. PATENT DOCUMENTS 3,014,167 12/1961 Winter et al. ................... 361/273 X

FOREIGN PATENT DOCUMENTS 526295 6/1931 Fed. Rep. of Germany ...... 361/304
876119 8/1961 United Kingdom ................ 361/273

Primary Examiner—Donald A. Griffin
Attorney, Agent, or Firm—Dowell & Dowell

[57] ABSTRACT

This invention relates to a metallized dielectric foil for making electric capacitors of the coiled type, wherein the transverse strips made in the metal coating between the uncovered longitudinal strip and the extra thick edge are connected to one another by longitudinal zones at the level of each of which the layer of metal presents a reduced thickness. An optimum cicatrization of the capacitor upon charging thereof is thus obtained. The invention also relates to capacitors incorporating such foils.

2 Claims, 2 Drawing Figures

METALLIZED DIELECTRIC FOIL FOR MAKING ELECTRICAL CAPACITORS OF THE COILED TYPE, AND CAPACITORS OBTAINED

The present invention relates to a metallized dielectric foil for making electrical capacitors of the coiled type, as well as to capacitors obtained.

It is known that, to make electrical capacitors of the coiled type, dielectric foils are used, constituted by a supple film-support made of paper or synthetic material and by reinforcements, formed either by a fine sheet of conducting metal or by deposition on one of its faces, for example by vaporization, of a fine layer of metal (zinc or other) adapted to constitute an electrically conducting reinforcement. Each foil presents along one of its longitudinal edges a non-metallized strip or uncovered margin, whilst, on the opposite edge, the layer of metal presents, on the contrary, a considerable thickness. To obtain a capacitor by coiling, two dielectric foils of the above type are superposed, care being taken, on the one hand, to inverse them so that the thicker edge of the one is disposed above the margin of the other, on the other hand, to introduce a slight transverse shift between the two foils.

The cylindrical body made by winding such a complex on itself is then provided with two frontal contact terminals which are connected to one or the other of the two thick metallized edges, and the whole is generally placed inside an insulating protective envelope which leaves the end terminals uncovered.

The dielectric of such a capacitor inevitably comprises faults, with the result that, upon first charging, this dielectric is the seat of localized discharges, the arcs thus produced provoking volatization of the metal around the faults. Insulation is thus established, this phenomenon being known as "auto-regeneration" or "cicatrization".

However, in the case of capacitors subjected to relatively high voltages, it may happen that the zone to be regenerated or "cicatrized" covers a large number of turns and that such regeneration becomes impossible. It is to overcome this risk that the metallized dielectric foils are provided with narrow non-metallized separating strips which extend transversely from the free edge or margin up to a short distance from the thicker edge. Surfaces or compartments are thus formed along the foil which are electrically connected to one another only by narrow metallized portions.

Despite this compartmentation, it may happen that the energy ½ CV2 of the discharge at the level of the connecting portions is still too low to burn these narrow portions and that the capacitor is really damaged. It has thus been proposed to provide the dielectric foils with non-metallized strips oriented longitudinally and presenting a discontinuous profile, in order to determine a series of meltable connecting bridges adapted to limit the energy to a value capable of allowing perfect regeneration or cicatrization.

The results obtained are satisfactory from the standpoint of the capacitor's behaviour, but, on the contrary, production of the interrupted strips raises difficult technical problems, which obviously have an unfavourable effect on the cost price of the finished articles.

It is an object of the present invention to overcome this drawback, essentially by providing the dielectric foils with a narrow zone with a very reduced thickness of metal, said zone being oriented longitudinally along the thick edge and being penetrated by the end of the transverse compartmentation strips.

Tests have shown that such a thinned longitudinal zone, easily obtainable during vaporization of the metal on the film-support, behaved from the functional standpoint at least as satisfactorily as the conventional discontinuous strips.

The invention will be more readily understood on reading the following description with reference to the accompany drawings, in which.

Figure 1:
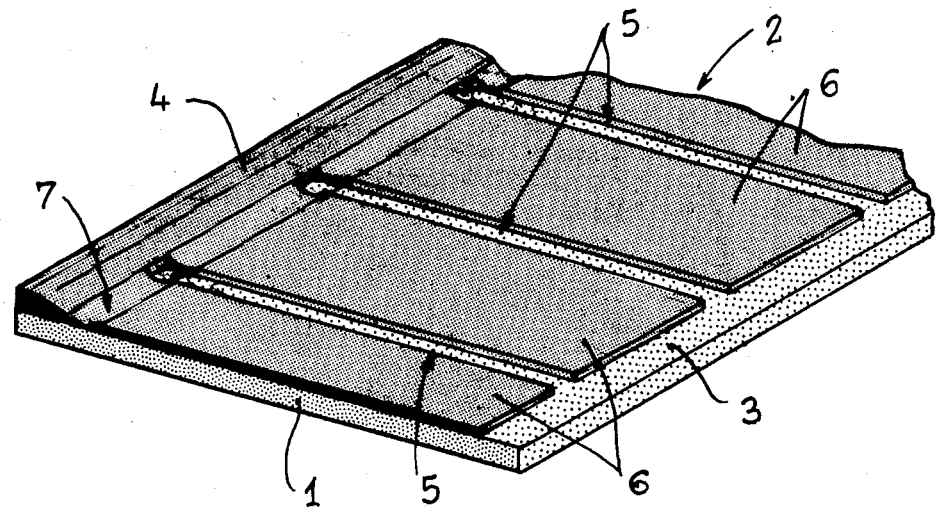
FIG. 1 shows very schematically in section a metallized dielectric foil made in accordance with the present invention.

Referring now to the drawings, reference 1 in FIG. 1 designates a film-support of the type usually used for making the dielectric foils, which film-support 1, for example made of paper, is coated on one of its faces with a metallized layer 2 obtained by vaporization in vacuo or like deposit. This layer 2 stops in conventional manner at a short distance from one of the longitudinal edges of the strip which constitutes the film-support 1, consequently defining a longitudinal, non-metallized strip or margin referenced 3. Along the opposite longitudinal edge, the metallized layer 2 presents, on the contrary, a continuous extra thickness 4. Finally, this layer 2 is interrupted in conventional manner by transverse strips 5 which, starting from the margin 3, stop immediately level with extra thickness 4, thus defining on the sheet a series of separate compartments 6 which communicate with one another only at the level of said extra thickness 4.

According to the present invention, the longitudinal zone 7 at the level of which the extra thickness 4 is connected with each of the compartments 6 is covered only by a very small thickness of metal coating, consequently defining in section a profile substantially in the form of a dish. Of course, the transverse strips 5 terminate inside this zone 7, as is clearly shown in the drawing.

Tests have shown that it was easy to make zone 7 during the operation of metallization by vaporization in vacuum and, by a precise calculation, each of the parts of this zone 7 included between two adjacent strips 5 could be given the desired resistivity.

Figure 2:
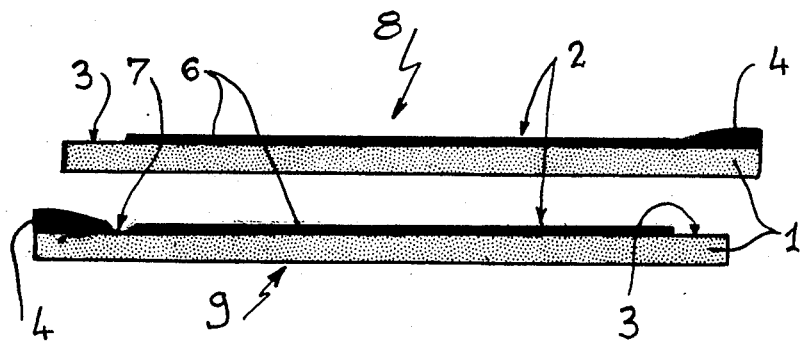
FIG. 2 illustrates the obtaining of the complex intended to be wound for making a capacitor.

The capacitor is made in conventional manner by superposing two foils 8 and 9 (FIG. 2) disposed so that the extra thick edge 4 of the one is placed opposite the edge 4 of the other, and by introducing a slight transverse offset between said foils 8 and 9. Tests have shown that the most advantageous results were obtained by using for complex 8-9 a sheet 9 presenting a thin-layer zone 7 and a sheet 8 comprising only the uncovered strip or margin 3 without strips 5 nor zone 7. This complex 8-9 is wound and treated in conventional manner, and it has been observed that, upon first charging of such a capacitor, the metal which forms the layer covering zone 7 of the sheet 9 vaporizes further to a possible puncture occurring between the different strips 5. The strip in which such puncture occurs is thus insulated and the energy ½ CV2 contained in the winding is not released at the level of the puncture with the risk of destroying the capacitor.

It goes without saying that the complex may be constituted with the aid of two correctly disposed foils 9.

It must, moreover, be understood that the foregoing description has been given only by way of example and that it in no way limits the domain of the invention which would not be exceeded by replacing the details of execution described by any other equivalents. It goes without saying that the invention also covers the capacitors made with the aid of the improved dielectric foils of the type described hereinabove.

What is claimed is:

1. In a metallized dielectric foil for making capacitors of the coiled type, of the type comprising a film-support coated, on one of its faces, with a layer of metal which leaves uncovered a strip along one of the longitudinal edges and transverse strips extending up to the level of the opposite longitudinal edge provided with an extra thickness, consequently determining intermediate compartments, the transverse strips are connected to one another by a longitudinal zone at the level of which the metallized layer presents only a much reduced thickness, so that this layer is vaporized in each of the zones under the effect of the discharge created by a possible puncture of the dielectric.

2. A coiled capacitor, of the type obtained by winding a complex formed by two metallized dielectric foils with strips, wherein the complex used comprises at least one foil of claim 1.

* * * * *